United States Patent
Cordova et al.

(10) Patent No.: US 6,486,960 B2
(45) Date of Patent: Nov. 26, 2002

(54) FIBER OPTIC SENSOR COIL AND TOOL FOR FORMING SAME

(75) Inventors: Amado Cordova, Venice, CA (US); Thomas McLean, Woodland Hills, CA (US); Thomas Meloeny, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 93 days.

(21) Appl. No.: 09/795,813

(22) Filed: Feb. 27, 2001

(65) Prior Publication Data

US 2002/0118367 A1 Aug. 29, 2002

(51) Int. Cl.[7] .............................. G01B 9/02; G01C 19/64
(52) U.S. Cl. ........................................ 356/464; 356/350
(58) Field of Search ................................. 356/464, 465, 356/350, 345; 250/731.12, 227.19, 227.27; 242/159

(56) References Cited

U.S. PATENT DOCUMENTS

| | | | | |
|---|---|---|---|---|
| 4,856,900 A | * | 8/1989 | Ivancevic | ................... 356/350 |
| 5,333,214 A | * | 7/1994 | Huang et al. | ................... 385/12 |
| 5,486,922 A | * | 1/1996 | Cordova | ..................... 356/350 |
| 5,545,892 A | * | 8/1996 | Bilinski et al. | ........ 250/231.12 |
| 5,818,590 A | * | 10/1998 | Patterson | .................... 356/350 |

* cited by examiner

Primary Examiner—Constantine Hannaher
Assistant Examiner—Otilia Gabor
(74) Attorney, Agent, or Firm—Elliott N. Kramsky

(57) ABSTRACT

A tool for forming a sensor coil that may be employed, for example, in a fiber optic gyroscope with reduced Shupe effect-induced bias. The tool includes a takeup reel having a cylindrical mandrel with inner flanges fixed to its opposed ends sandwiched between two outer flanges. Each of the inner flanges includes a pair of radially-directed apertures that form a radially-directed wedge therebetween. A recess in the planar portion of each of the outer flanges that contacts an inner flange is aligned with the apertures. This permits the winding of the sensor coil to form climbing turns at the ends of wound layers that lie outside an encapsulated fiber pack. Such turns, which join layers with overlying layers, avoid crossovers and the resultant stress that contributes significantly to Shupe effect-induced bias. A sensor coil having reduced internal stress is thus also provided.

20 Claims, 4 Drawing Sheets

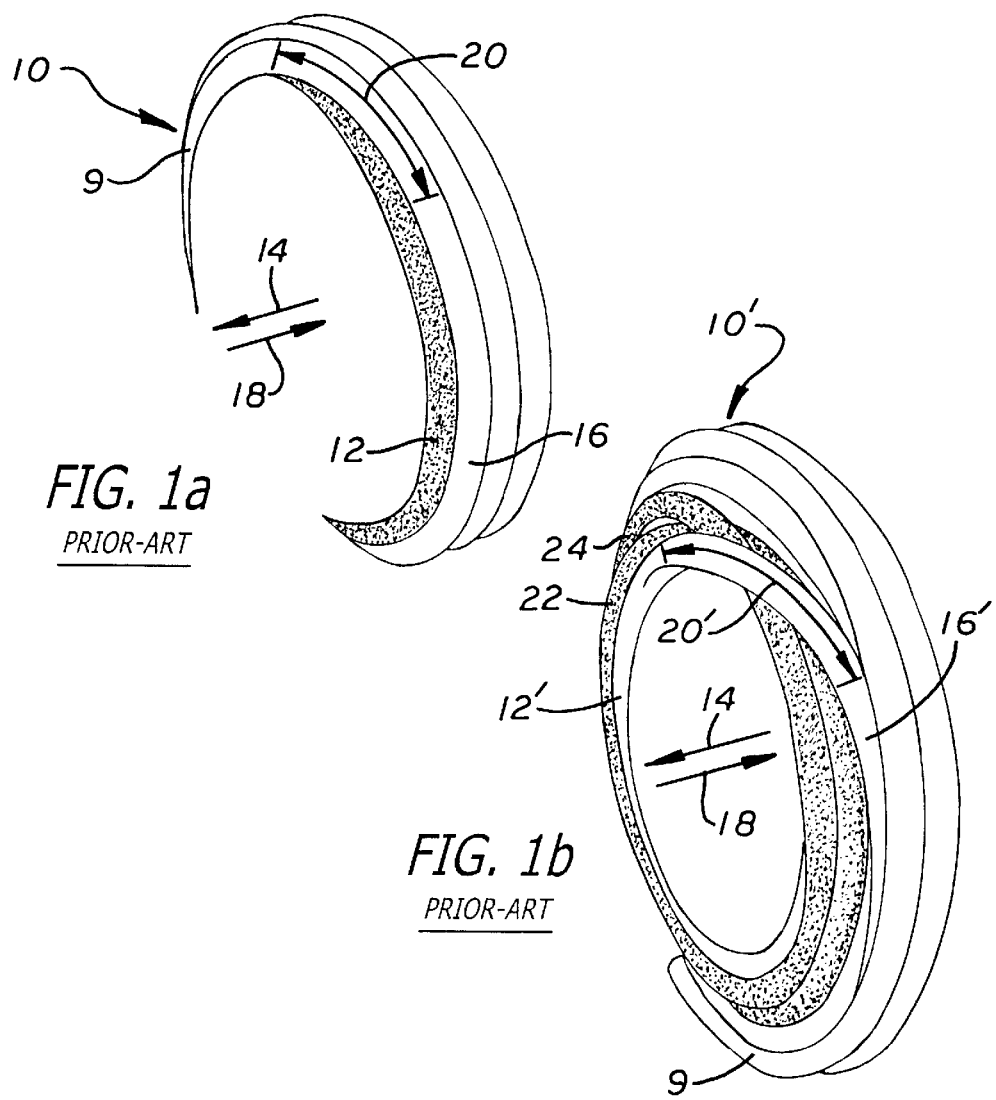
FIG. 1a PRIOR-ART
FIG. 1b PRIOR-ART
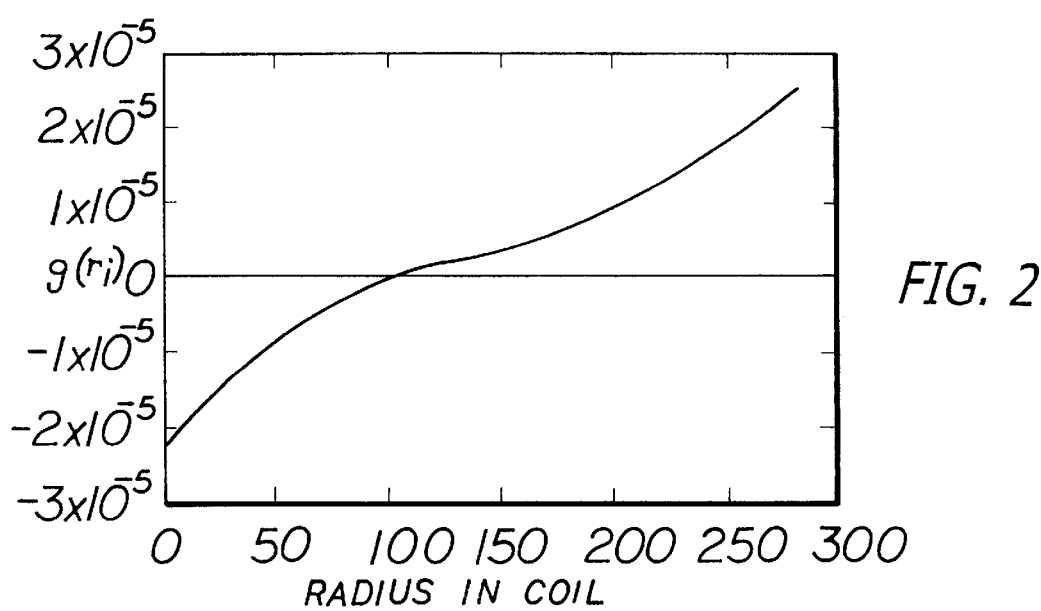
FIG. 2

FIBER OPTIC SENSOR COIL AND TOOL FOR FORMING SAME

BACKGROUND

1. Field of the Invention

The present invention relates to fiber optic coils. More particularly, this invention pertains to a sensor coil with reduced bias and to a tool for use in forming such a coil.

2. Description of the Prior Art

One application of a fiber optic sensor coil is in a fiber optic gyroscope. The fiber optic gyroscope generally comprises the following components: (1) a light source, (2) a beamsplitter (either a fiber optic directional coupler or an integrated-optics Y-junction), (3) a fiber optic coil, (4) a polarizer (and sometimes one or more depolarizers), and (5) a detector. Light from the light source is split by the beamsplitter into copropagating and counterpropagating waves travelling in the sensing coil. The associated electronics measures the phase relationship between the two interfering, counter-propagating beams of light that emerge from opposite ends of the coil. The difference between the phase shifts experienced by the two beams provides a measure of the rate of rotation of the platform to which the instrument is fixed.

Environmental factors can affect the measured phase shift difference between the counterpropagating beams, thereby introducing a bias or error. Such environmental factors include variables such as temperature, vibration (acoustical and mechanical) and magnetic fields. Such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

One approach to attain a reduction of sensitivities arising from environmental factors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for non-reciprocities in "compensation of Linear Sources of Non-Reciprocity in Sagnac Interferometers". *Fiber Optics and Laser Sensors I*, Proc. SPIE Vol. 412 p. 268 (1989). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned United States patents are the property of the assignee herein.

While the above-identified symmetrical winding techniques and geometries help minimize bias error, they, as well as all sensor coils, are based upon coil winds in which overlying coaxial layers are wound from flange to flange (or end to end) about a mandrel. Such general geometry, for example, creates a plurality of fiber turnaround regions that join the end turns of wound layers. As layers, sometimes adjacent to one another (in the case of a quadrupole-wound coil, the fiber must climb two layers in a turnaround region), are wound in opposite senses, the optical fiber must necessarily cross over turns of an underlying layer when the direction of winding reverses, creating small-radius microbends that are known to create undesired phase shifts (in addition to other error sources introduced by the coil winding process).

SUMMARY OF THE INVENTION

The present invention provides, in a first aspect, a sensor coil for sensing a physical parameter, such as in a fiber optic gyroscope. Such sensor coil includes an optical fiber. The fiber comprises a plurality of coaxial layers of turns. The layers of turns are encapsulated with potting material to form a fiber pack.

A climbing turn joins a layer of turns to an overlying layer of turns. Each of the climbing turns is located outside the fiber pack.

In a second aspect, the invention provides a tool for forming a fiber optic sensor coil. Such tool includes a reel for receiving and accommodating an optical fiber during winding. The reel comprises a cylindrical mandrel and a pair of inner flanges. Each of the inner flanges is substantially planar and fixed to one of the opposed ends of the cylindrical mandrel so that the inner flanges are substantially parallel to one another.

A pair of outer flanges is provided. Each of the outer flanges is substantially planar and each is in contact with the outwardly-facing surface of one of the inner flanges of the reel. Each of the flanges of the reel has a pair of apertures defining a wedge therebetween.

In a third aspect, the invention provides a method for forming a potted sensor coil in which an optical fiber is formed into a plurality of coaxial cylindrical layers of turns on a takeup reel that includes a cylindrical mandrel with generally-planar flanges fixed substantially parallel to one another at opposed ends of the mandrel.

The method is begun by providing a radially-directed wedge in each of the flanges of the takeup reel. Thereafter, the optical fiber is threaded the therearound as the coil is wound so that the coil is formed with climbing layers located outside a potted fiber pack.

The foregoing and additional features of the invention will become further apparent from the detailed description that follows. Such description is accompanied by a set of drawing figures in which numerals, corresponding to numerals of the written text, point to the various features of the invention with like numerals referring to like features throughout both the drawing figures and the written description.

BRIEF DESCRIPTION OF THE DRAWINGS

FIGS. 1(*a*) and 1(*b*) are enlarged partial perspective views for illustrating the stress-inducing fiber crossover that occurs at the ends of helically and quadrupole-wound optical sensor coils, respectively;

FIG. 2 is a graph of thermally-induced stress as a function of fiber position in a potted sensor coil;

DETAILED DESCRIPTION OF THE PREFERRED EMBODIMENT

Figure 3:
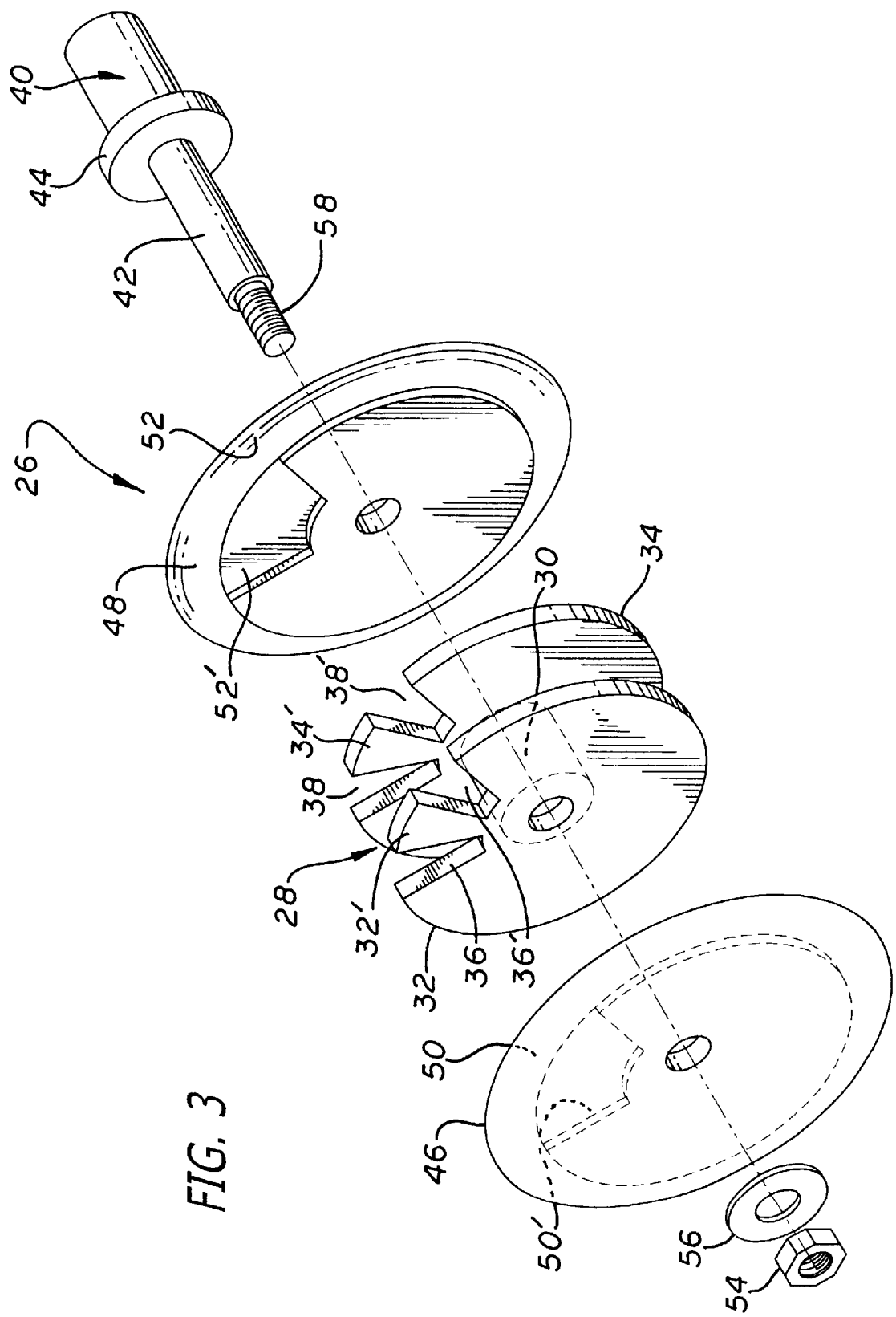
FIG. 3 is an exploded perspective view of a tool for winding a fiber optic sensor coil that achieves reduced turnaround stress-induced bias in accordance with the invention.

FIGS. 1(a) and 1(b) are enlarged partial perspective views that illustrate the phenomenon of crossover that necessarily occurs at the turnaround regions of windings of an optical fiber 9 in a potted sensor coil (helical wound 10 or quadrupole wound 10') in accordance with the prior art.

Referring first to the helically-wound coil 10, one may observe that end turn 12 of an underlying layer wound in direction 14 connects to end turn 16 of an overlying layer wound in the opposite direction 18. It can be seen that a portion 20 of a climbing turn within the turnaround region of the optical fiber 9 crosses over the underlying end turn 12 due to the reversal of the sense or direction of winding of the fiber 9 in such region. As will be discussed below, the inventors have found that, and analysis has confirmed, fiber crossover results in a significant contribution to Shupe effect bias in the output of a rotation rate sensor employing a potted sensor coil.

Turning to the quadrupole-wound sensor coil 10' illustrated in FIG. 1(b). As discussed below, the effect of fiber crossover is increased in a quadrupole-wound sensor coil. The length of the crossover portion 20' is greater in such a coil 10' than that in a helically-wound coil 10. Again, the turnaround region serves to advance one half of the symmetrical optical fiber 9 from an end turn 12' of an inner layer wound in the direction 14 to an end turn 16' of an overlying layer wound in the opposite direction 18. However, in traversing between the two layers, the fiber 9 must climb over end turns 22, 24 of two intermediate layers of windings formed from a symmetrical half of the fiber 9. As a result, while the crossover portion 20 of the fiber in a helically-wound coil 10 is on the order of ten (10) degrees, the crossover portion 20' of a quadrupole-wound coil 10' is approximately thirty (30) degrees.

The inventors have found that the unavoidable presence of fiber crossover regions at the ends of wound layers contributes significantly to the Shupe bias of a rotation rate sensor subjected to increasing temperatures. FIG. 2 is a graph illustrating the well-known "S-curve" that describes strain (per degree Centigade change in temperature), a major contributor to Shupe effect-induced bias, and coil radius. As can be seen, strain, and the concomitant temperature-dependent Shupe effect, is cumulative, eventually increasing exponentially as coil radius increases. The inventors have found that the major contribution to such strain may be attributed to the turnaround phenomenon discussed above. The origin of such effect lies with the compression of the relatively-soft inner layer or jacket that surrounds an optical fiber.

It is well known that an optical fiber generally comprises four distinct physical elements. A glass cladding has a central core of contrasting index of refraction for guiding the light therein. The glass cladding and core are protected by a soft inner jacket, preferably of silicone and an overlying, relatively hard jacket of acrylate or like material. It is the function of the inner jacket to isolate the optical fiber from stressing. Unfortunately, when crossovers are encountered at turnaround regions, the soft inner jacket of both underlying and overlying fiber portions are invariably compressed, lessening the attendant stress isolation function and juxtaposing the fiber to closer proximity to both its and the adjacent turn's hard outer jacket and cladding. As the crossovers stress the involved fiber to the point that sections of cladding almost touch one another without the benefit of cushioning by the intervening inner jackets, the fiber goes into a nonlinear stress regime. This, of course, contributes significantly to the stressing of the optical fiber, the bulk stress within the potted coil as illustrated in FIG. 2 and to temperature-dependent Shupe bias.

The present invention addresses and minimizes the accumulated stress and resultant Shupe bias introduced by fiber stressing at coil turnaround regions by a sensor coil geometry that includes stress relief at turnaround regions. FIG. 3 is an exploded perspective view of a tool 26 for forming such a coil. The tool 26 includes a takeup reel 28 comprising a cylindrical shaft or mandrel 30 (shown in shadow outline in this figure) and inner flanges 32, 34 affixed to the opposed ends thereof. Each inner flange includes a radially-directed wedge 32', 34' that protrudes from and is centered within a two-part radial recess comprising inwardly-directed wedge-like sections 36, 36' and 38, 38' respectively.

A shaft-like adapter 40 for mounting the tool 26 lies at the end of a drive shaft 42 with an end stop flange 44 as separation therebetween. The adapter 40 is appropriately sized to be received within the mandrel 30 for rotatably driving the takeup reel 28 during the coil winding process. During the manufacture of a sensor coil in accordance with the invention, the tool 26 provides a takeup reel that is fed optical fiber from an appropriate feed apparatus (which may comprise two feed reels in the case of a quadrupole-wound coil) in which the central shaft 30 acts as a mandrel upon which the coil is formed.

The reel 28 is sandwiched between a pair of circular, plate-like outer flanges 46 and 48. Each of the outer flanges 46, 48 is preferably of molded plastic material and includes an outwardly-directed arcuate rim 50, 52 at its inner face. Radially-directed, wedge-shaped recesses 50', 52' are formed within the inner surfaces of the outer flanges 46 and 48. When assembled for use, as illustrated in the following figure, it will be seen that the wedge-like recesses 50', 52' are substantially aligned with the radially-directed wedges 32', 34' respectively to create clearances for forming stress relief areas at turnaround regions of the coil. A nut 54 with associated washer 56 receives a threaded end 58 of the adapter 40 for securing the tool 26 assembly.

Figure 4A:
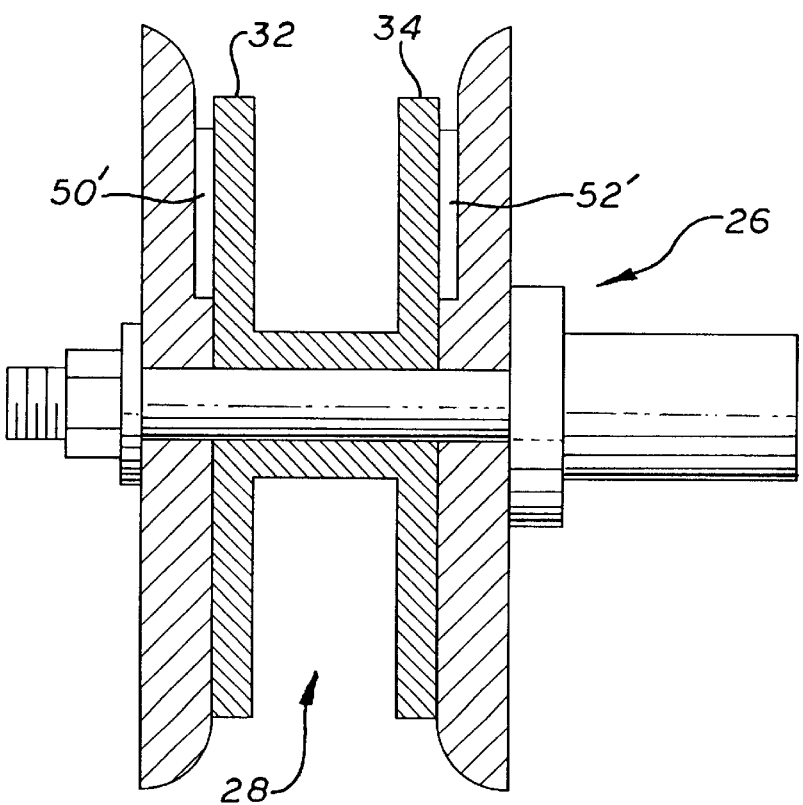
FIGS. 4(a) and 4(b) are cross-sectional elevation and top views, respectively, of the assembled tool of the invention.
Figure 4B:
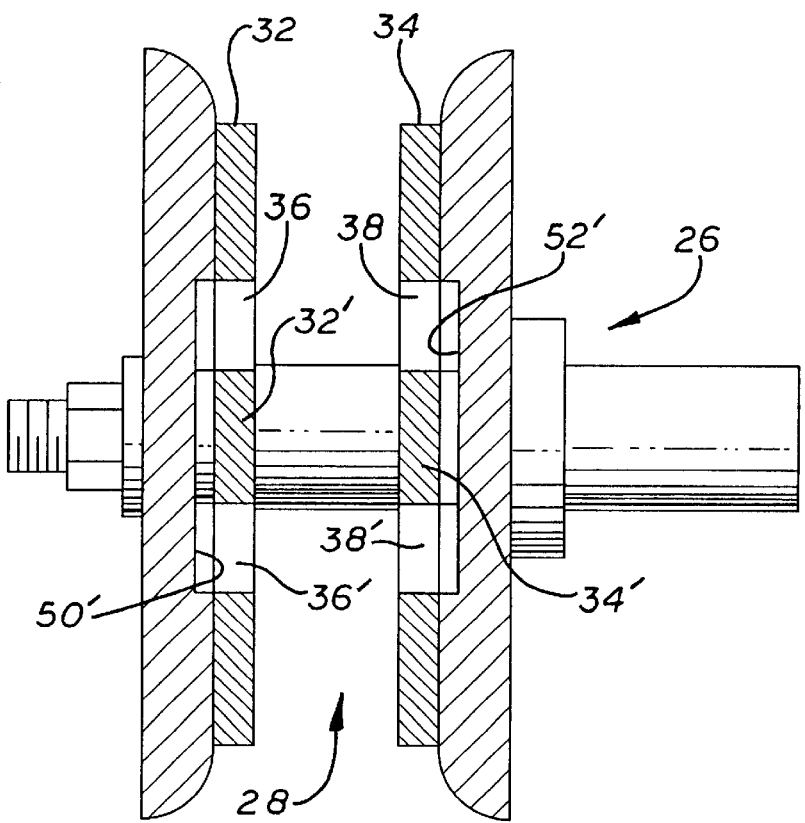

FIGS. 4(a) and 4(b) are side elevation and top views of an assembled tool 26. As can be seen, when assembled, passageways, comprising the communicating voids of the wedge-like sections 36, 36' and recess 50' (and wedge-like sections 38, 38' and recess 52') are created around the radially-directed wedges 32' and 34'. Such passageways permit the winding of a sensor coil (illustrated in the following figures) having side stress-relief regions protruding from the potted fiber pack that greatly reduce internal stressing. In operation, coil layers are successively wound from the inner flange 32 to the inner flange 34, and vice versa, with potting material applied that separates overlying layers from one another so that the fiber turns of adjacent layers of the fiber pack, wound in opposite senses, do not squeeze one another.

After the end of a wound layer is reached adjacent one of the inner flanges 32 or 34, the optical fiber is threaded outside and around the wedge 32' or 34' of the respective inner flange to climb one or two (in the case of a quadrupole-wound coil) layers, then to reemerge within the takeup reel 28 above the just-wound layer to then be wound toward the other one of the inner flanges 32 or 34. In the case of a helically-wound coil, the process is then repeated with the optical fiber being threaded about the radially-directed wedge associated with the opposed flange.

Figure 5A:
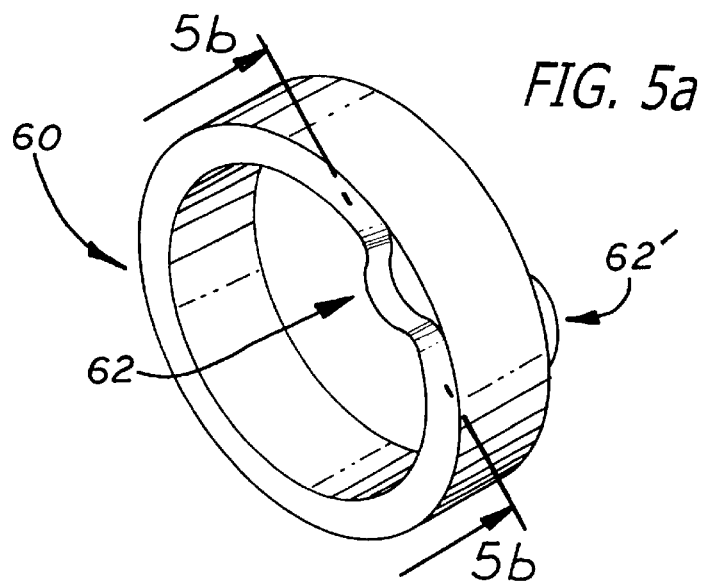
FIGS. 5(a) and 5(b) are a perspective and an enlarged partial sectional view, respectively, of a sensor coil in accordance with the invention.
Figure 5B:
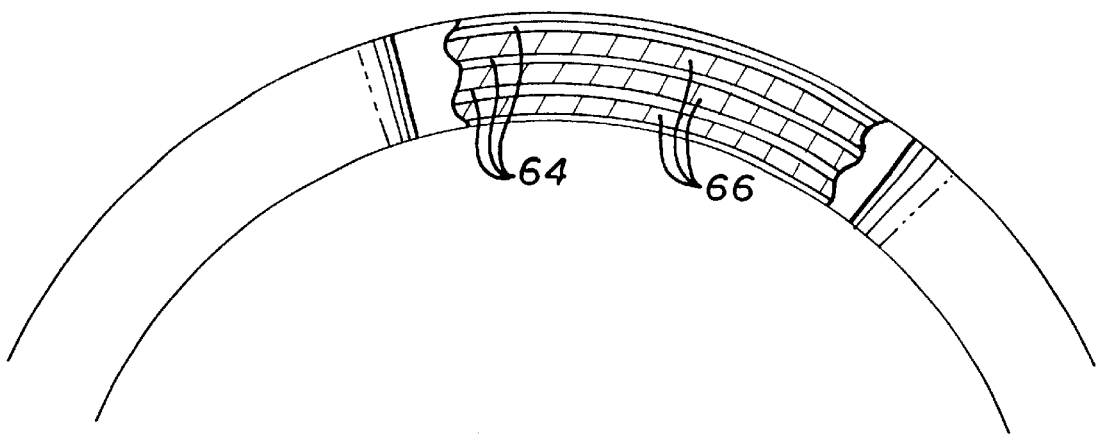

The resultant sensor coil includes loop-like stress relief regions at opposed sides of the potted cylindrical fiber pack. Such a sensor coil is illustrated in FIGS. 5(a) and 5(b) which present perspective and enlarged partial sectional views of a potted sensor coil 60 in accordance with the invention. The sensor coil 60 is characterized by substantially less internal stress than a conventional prior art coil, such as that illustrated in FIG. 1(a) or 1(b) in which fiber crossovers occur at turnaround regions. In contrast, in a sensor coil 60 in accordance with the invention, formed with a tool 26 including a takeup reel 28, climbing turns connecting layers of turns are free from the illustrated stress-inducing crossovers. Rather, referring to the tool 26 as illustrated in FIGS. 3, 4a and 4b, climbing turns that connect overlying layers are located at the side of the fiber pack of the coil 60 with successive climbing turns being gathered, aligned and potted to form ribbons 62, 62'. The potting-material of the ribbons 62, 62' is preferably of lower Young's modulus than that of the fiber pack of sensor coil 60.

Referring to the enlarged partial sectional view of FIG. 5b, the ribbon 62 is seen to encapsulate a plurality of loops 64 of the optical fiber forming the coil 60. No fiber crossover occurs as climbing turns are formed outside the takeup reel 28 when a tool 26 in accordance with the invention is utilized. In this way, fiber turnarounds and layer climbing are isolated from the remainder of the layers of turns of the sensor coil 60. As can be observed in FIG. 5b, successive climbing turns are aligned parallel to one another with layers 66 of potting material therebetween. In this way, the turn-around regions contribute no more stress to the coil 60 than do the remainder of the wound layers.

Thus it is seen that the present invention provides both an improved sensor coil that may be employed, for example, in a fiber optic gyroscope and a tool for in forming such a coil. By applying the teachings of the invention, one may obtain data of greater accuracy with a fiber optic gyroscope employing a sensor coil in accordance with the invention as the output of such a gyroscope is less subject to temperature-related Shupe effect bias than one employing a prior art sensor coil.

While the invention has been described with reference to its presently-preferred embodiment, it is not limited thereto. Rather, this invention is limited only insofar as it is defined by the following set of patent claims and includes within its scope all equivalents thereof.

What is claimed is:

1. A sensor coil comprising, in combination:
   a) an optical fiber;
   b) said fiber comprising a plurality of coaxial layers of turns;
   c) said plurality of layers being encapsulated with potting material to form a fiber pack;
   d) a climbing turn joining a layer of turns with an overlying layer of turns; and
   e) each of said climbing turns being located outside said fiber pack.

2. A sensor coil as defined in claim 1 wherein each of said climbing turns is located at the end of a layer of turns.

3. A sensor coil as defined in claim 2 wherein each of said climbing turns generally comprises a loop.

4. A sensor coil as defined in claim 3 comprising a plurality of climbing turns located at opposite ends of said fiber pack.

5. A sensor coil as defined in claim 4 wherein each of said plurality of climbing turns is encapsulated in potting material.

6. A sensor coil as defined in claim 5 wherein each of said encapsulated pluralities of climbing turns comprises a ribbon of parallel fiber loops.

7. A sensor coil as defined in claim 6 further characterized in that said fiber pack and said pluralities of climbing turns are encapsulated with different potting materials.

8. A sensor coil as defined in claim 7 wherein the Young's modulus of said potting material of said climbing turns is less than the Young's modulus of said potting material of said fiber pack.

9. A tool for forming a fiber optic sensor coil comprising, in combination:
   a) a reel for receiving and accommodating an optical fiber during winding;
   b) said reel comprising a cylindrical mandrel and a pair of inner flanges, each of said inner flanges being substantially planar and each being fixed to one of the opposed ends of said cylindrical mandrel so that said inner flanges are substantially parallel to one another;
   c) a pair of outer flanges;
   d) each of said outer flanges being substantially planar and each being in contact with the outwardly-facing surface of one of said inner flanges of said reel; and
   e) each of said flanges of said reel having a pair of apertures defining a wedge therebetween.

10. A tool as defined in claim 9 further characterized in that:
    a) the surface of each of said outer flanges that contacts an inner flange comprises a planar interior portion;
    b) said planar interior portion has a recess therein; and
    c) said recess is aligned with the portion of said contacting inner flange that includes said apertures and wedge.

11. A tool as defined in claim 10 wherein said wedge is radially-directed.

12. A tool as defined in claim 10 wherein each of the outer flanges further includes:
    a) a rim comprising an arcuate cross-section; and
    b) said rim comprising the peripheral portion of an outer flange.

13. A tool as defined in claim 12 wherein each of said outer flanges further includes:
    a) a planar outer surface;
    b) said planar outer surface being generally parallel to said planar interior portion; and
    c) said rim connecting said planar outer surface to said planar interior portion.

14. A tool as defined in claim 13 wherein said arcuate rim extends inwardly from the periphery of said planar outer surface to the boundary of said planar interior portion.

15. A tool as defined in claim 14 wherein each of said inner flanges is generally disk-shaped.

16. A tool as defined in claim 14 wherein each of said outer flanges is generally disk-shaped.

17. A tool as defined in claim 14 wherein each of said outer flanges comprises plastic.

18. A method for forming a potted sensor coil in which an optical fiber is formed into a plurality of coaxial cylindrical layers of turns on a takeup reel that includes a cylindrical mandrel with generally-planar flanges fixed substantially parallel to one another at opposed ends of said mandrel, said method comprising the steps of:

a) providing a radially-directed wedge in each of said flanges; and then b) threading said optical fiber threrearound as said coil is wound so that said coil is formed with climbing layers located outside a potted fiber pack.

19. A method as defined in claim 18 further including the steps of:

a) providing a pair of outer flanges; and then b) arranging each of said outer flanges substantially planar and in contact with an outwardly-facing surface of one of said flanges of said reel.

20. A method as defined in claim 19 further including the steps of:

a) providing a recess within said contacting surfaces; and b) substantially aligning said recess with said radially-directed wedge of said contacting flange of said reel.

* * * * *